(12) United States Patent
Ishizuka et al.

(10) Patent No.: US 7,830,571 B2
(45) Date of Patent: Nov. 9, 2010

(54) SYSTEM, APPARATUS AND METHOD FOR DOCUMENT MANAGEMENT

(75) Inventors: Hiroaki Ishizuka, Ridgewood, NJ (US); Hiroaki Numata, Yokohama (JP)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 992 days.

(21) Appl. No.: 11/529,170

(22) Filed: Sep. 28, 2006

(65) Prior Publication Data

US 2008/0080017 A1   Apr. 3, 2008

(51) Int. Cl.
*H04N 1/46* (2006.01)
*G06F 7/00* (2006.01)
*G06F 17/00* (2006.01)

(52) U.S. Cl. .................... 358/537; 707/609; 711/163

(58) Field of Classification Search ................ 358/452, 358/537, 448, 1.9, 1.15, 1.16, 403; 707/9, 707/203, 600, 603, 609, 640, 661, 665, 667, 707/668; 711/147, 163; 382/305; 715/201, 715/255

See application file for complete search history.

(56) References Cited

U.S. PATENT DOCUMENTS

| | | | |
|---|---|---|---|
| 6,035,308 A * | 3/2000 | Yano et al. | 715/201 |
| 6,438,548 B1 | 8/2002 | Grim, III et al. | |
| 6,631,495 B2 * | 10/2003 | Kato et al. | 715/255 |
| 6,983,417 B2 * | 1/2006 | Kagimasa et al. | 715/255 |
| 7,042,594 B1 | 5/2006 | Dawe et al. | |
| 7,069,592 B2 * | 6/2006 | Porcari | 726/26 |
| 2002/0002567 A1 | 1/2002 | Kanie et al. | |
| 2002/0019838 A1 | 2/2002 | Petrogiannis | |
| 2004/0205538 A1 | 10/2004 | Banerjee et al. | |
| 2005/0160356 A1 * | 7/2005 | Albornoz et al. | 715/512 |
| 2006/0136511 A1 | 6/2006 | Ngo et al. | |
| 2006/0136513 A1 | 6/2006 | Ngo et al. | |

FOREIGN PATENT DOCUMENTS

GB   2421606 A   6/2006

OTHER PUBLICATIONS

Dec. 19, 2007 European search report in connection with corresponding European patent application No. EP 07 25 3832.

* cited by examiner

*Primary Examiner*—James A Thompson
(74) *Attorney, Agent, or Firm*—Cooper & Dunham LLP

(57) ABSTRACT

An improved approach for managing a document having a plurality of versions is provided. For example, a scanned version of an edited hardcopy of the document is received from an image capture device and uploaded to an electronic database. The scanned version of the hardcopy of the document is linked to a previous electronic version of the document in the database as an update of the previous electronic version. A grouping of a plurality of electronic versions of the document is maintained in the database.

24 Claims, 9 Drawing Sheets

Fig. 5A

Account Name: Litig#1
Username: JohnSmith
Password:

Fig. 5B

JohnSmith — go back

Working Documents | Template Documents | Search Documents

Fig. 5C

Working Documents — go back

Document#1
Document#2
.
.
Document#N

Recent Version
All Versions

Fig. 5D

Document view — go back

Print Document

Fig. 5E

Search Documents — go back

Search for:
Keyword | enter search term

Run Search

SYSTEM, APPARATUS AND METHOD FOR DOCUMENT MANAGEMENT

TECHNICAL FIELD

This application relates to document management systems, apparatuses and methodologies. In particular, the application relates to an approach for maintaining multiple versions of a document wherein at least one version is a scanned version of an edited hardcopy of a document.

BACKGROUND

There are many instances in which the preparation of a document involves input from multiple individuals. In such a circumstance, a working document (that is, still under review and subject to change) is typically circulated by the author thereof to one or more additional persons, by electronic mail. The working document in such a circumstance may, additionally or alternatively, be stored at a central location, such as in a database or data repository, and the document in the database or data repository may be accessed by any of various authorized persons.

Documents often are revised many times before a final document is created. During the course of the revision process, many versions of the document may be generated, sometime in parallel. It is typically desirable to collect and maintain the different versions of the document, for reference or comparison, before (and sometimes even after) the document is finalized. Depending on the complexity of the document and/or the number of people involved in the revision process, there may be a large number of versions of the document to be correlated to each other. Management of multiple versions of a document, and moreover association of a revised version with its previous version is not always straightforward, for example, when multiple persons can access and revise the same working document. That is, a previous version can have multiple successor versions.

Versioning tools and systems have been proposed for maintaining the different versions of a document, as the working document is revised. Each revised version is added to a database or repository, in addition to the original version. The various versions of a document in such a system are typically generated by revising a previous version in electronic form using the same application software (for example, word processor, etc.). In such a homogeneous environment, the author creates the document on a computer, and the document is revised on one or more other computers utilizing similar application software tools. The versioning system may include tools for determining the differences between a revised version and a previous version of the document.

The tools and systems proposed by others for maintaining different versions of a document fail to recognize that there remain many circumstances today in which the editing of the working document is performed by annotation on a hardcopy of the working document, and the annotated hardcopy is scanned to create an edited version of the document. There remains a need for an improved document management tool which allows one to track the multiple versions of a document wherein one or more versions of the document are scanned versions of an edited hardcopy of the document.

SUMMARY

The disclosure provides document management tools which allow one to track the multiple versions of a document wherein one or more of the versions of the document are scanned versions of an edited hardcopy of the document.

The disclosure provides a method for managing documents. In one exemplary embodiment, the method includes receiving a scanned version of an edited hardcopy of a document from an image capture device, uploading the scanned version of the hardcopy of the document to an electronic database, linking the scanned version of the hardcopy of the document to a previous electronic version of the document in the database as an update of the previous electronic version, and maintaining a grouping of a plurality of electronic versions of the document in the database.

The application also provides a document management apparatus. In one exemplary embodiment, the document management apparatus includes a first interface for communication with an image capture device, a second interface for communication with an electronic database, and a document manager configured to process a scanned version of a document received through the first interface, the processing by the document manager including sending the scanned version of the document to the electronic database through the second interface, linking the scanned version of the document to a previous electronic version of the document in the database as an update of the previous electronic version, and maintaining a grouping of a plurality of electronic versions of the document in the database.

The document management tools of this disclosure may be a computer program product stored in or on a program storage medium readable by a computer and tangibly embodying a program of instructions executable by the computer and comprising a document receiving part configured to receive a scanned version of a document from an image capture device through a data communication network, and a document manager part configured to store the scanned version of the document in an electronic database, and link the scanned version of the hardcopy of the document to a previous electronic version of the document in the database as an update of the previous electronic version, and maintain a grouping of a plurality of electronic versions of the document in the database.

This disclosure also provides a system for managing documents. In one exemplary embodiment, the system includes one or more image capture devices, an electronic database, and a document manager coupled to the one or more image capture devices through a data communication network, wherein when the document manager receives a scanned version of a document through the data communication network, the document manager sends the scanned version of the document to the electronic database, causes the scanned version of the document to be linked to a previous electronic version of the document in the electronic database as an update of the previous electronic version, and causes a grouping of a plurality of electronic versions of the document to be maintained in the database.

BRIEF DESCRIPTION OF THE DRAWINGS

The features of the present application can be more readily understood from the following detailed description with reference to the accompanying drawings wherein:

FIGS. 5A through 5E illustrate some exemplary user interface screens which can be displayed on the image capture device of FIG. 4;

DETAILED DESCRIPTION

Figure 1:
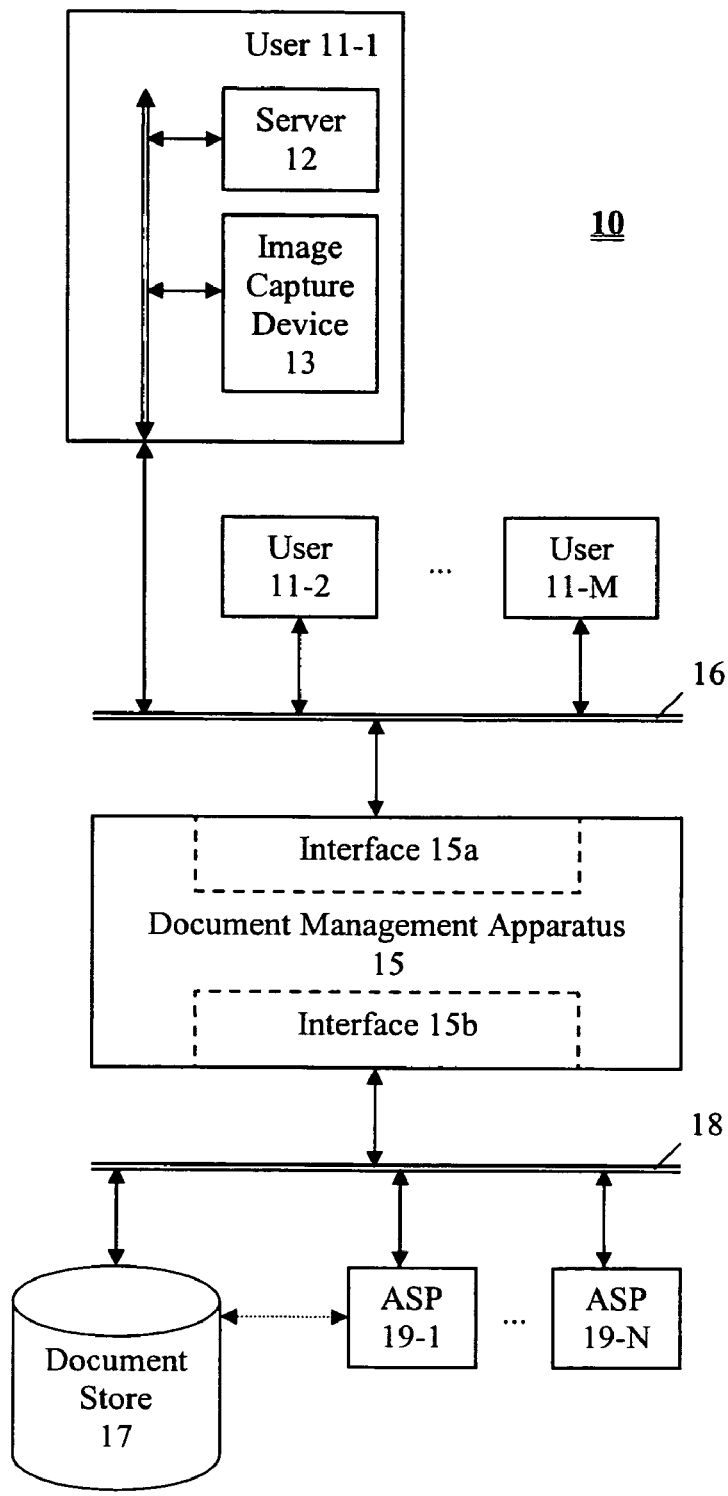
FIG. 1 shows a block diagram of a system for managing documents, in accordance with an exemplary embodiment of the present disclosure.

In describing preferred embodiments illustrated in the drawings, specific terminology is employed for the sake of clarity. However, this disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 shows a block diagram of a system for managing documents according to an example of the present disclosure. System 10 includes at least one user site 11-1 (but preferably a plurality of user sites 11-1 through 11-M), a document manager 15, a document store or database 17 and at least one ASP (application service provider) 19-1 (but preferably a plurality of ASPs 19-1 through 19-N). The document manager 15 is connected to the user site 11-1 via network 16, and is connected to the ASP 19-1 via network 18.

Each of the networks 16 and 18 is preferably the Internet, but can also be a local area network, a wide area network or any type of network such as an intranet, an extranet, the Internet, or a combination thereof. An extranet may be used to provide controlled access to external users, for example through the Internet. Further, other communications links (such as a virtual private network, a wireless link, etc.) may be used as well for each of the networks 16 and 18. In addition, each of the networks 16 and 18 preferably uses TCP/IP (Transmission Control Protocol/Internet Protocol), but other protocols can also be used. In another example, network 16 and 18 may be interconnected or the same network. How devices can connect to and communicate over networks 16 and 18 is well-known in the art and is discussed for example, in "How Networks Work", by Frank J. Derfler, Jr. and Les Freed (Que Corporation 2000) and "How Computers Work", by Ron White, (Que Corporation 1999), the entire contents of which are incorporated by reference herein.

As shown in FIG. 1, the user site 11-1 (and similarly user sites 11-2 through 11-N) includes at least one image capture device 12 and can further include a server 13 which provides access to a group ware database (not shown), and additional devices such as printer, local storage device, removable media drives, other multifunction devices (for example, the Ricoh eCabinet®, in order to capture, store and retrieve paper and electronic documents from different office peripherals), etc.

The image capture device 13 can be any device including a scanner, such as a multi-function device (MFD) which includes scanning, copying, printing and faxing functions. The image capture device can have any or all of the functions of similar devices conventionally known, such as create web pages, send and receive e-mails with attachments, edit images, FTP files, surf the Internet, send a fax, etc.

In a preferred embodiment, the image capture device 13 provides a graphical user interface (GUI) so as to allow an operator of the image capture device to interact conveniently with the services provided by the document manager 15. The GUI can be downloaded by the image capture device 13 from the document manager 15 via the network 16. The image capture device 13 can display the GUI on a display screen for the operator. A browser (such as Internet Explorer™, Netscape Navigator™, or a proprietary browser) may be provided on the image capture device 13 so that the operator of the image capture device 13 can access the document store through the document manager 15 using browsing operations.

For example, as discussed further below, a user can use the browser to download a document from the document store and print the document or a template provided by the system. Templates are provided in the system to help the user streamline the business process and it can be a combination of standard business templates and user customized templates (for example, developed on a personal computer). Accordingly, templates can be stored in the document store and/or locally at the user site, and/or may be provided by the document manager from elsewhere.

As shown in FIG. 1, the document management apparatus 15 includes an interface 15a for communications through the network 16 (for example, with the image capture device 13) and an interface 15b for communication through the network 16 (for example, with the database 17 and with the ASP 19-1). The image capture device 13 can interact (exchange data) with the document manager 15 via the network 16, so as to benefit from a number of services provided by the document manager 15. For example, a request to search for and retrieve a document or a request to store a document scanned by the image capture device 13 can be sent from the image capture device 13 to the document manager 15. Other information (such as user identification, password, the name of the person scanning the document, the name of the author of the document, the date and time of the scanning, the version of the document, the serial number and/or location of the image capture device, etc.) may also be communicated from the user site 11-1 to the document manager 15.

The document manager 15 is configured to receive a document (for example, a scanned version of an annotated hardcopy of a document) received through the interface 15a from the image capture device 13, and process the received document including uploading the received document (optionally through ASP 19-1) to the document store or database 17 through the interface 15b. The document manager 15 may also interact with the database 17 to determine whether a previous version of the document is stored in the document store or database, and if there is a previous version, link the received document to the previous version in the database as an update of the previous version. The document manager associates each version of a document with a corresponding unique document index ID, and the plurality of versions of the document are stored in the document store along with their respective document index IDs. Accordingly, a grouping of the various electronic versions of the document in the database can be maintained.

Further, the user is provided with the option of finalizing a version of a document. When a template or a working document is printed, the printed hardcopy bears a corresponding document index ID and also provides a predetermined location thereon (for example, a checkbox or a signature block)

where the user can indicate that the document is to be finalized. After the document is edited with typed and/or handwritten annotations and then scanned, the scanned image is processed to extract the document index ID information and finalization information. If the finalization information indicates that the document is to be finalized and requirements for finalization are confirmed, the scanned version is locked as the final version of the document. In addition, the image capture function can be provided by a personal computer coupled to a scanner (discussed below), and the finalization feature can apply to electronic documents created or modified on the personal computer. A software application (such as a word processor, spreadsheet, etc.) may lock a document as the final version of that document, and thereby prevent the document from being changed. The above-mentioned finalization features are further discussed below.

Additional services provided by the document manager 15 are described in commonly-owned U.S. application Ser. Nos. 09/684,965, 09/785,433, 09/795,438, 09/839,263, 09/839,221, 09/840,155, 09/949,969 and 10/116,162, the entire contents of each of which are incorporated by reference herein.

The terms "application service provider", "ASP", "SaaS" and "Software As A Service" are used interchangeably herein to refer to providing to customers access over a network (such as the Internet) to application software and related software services that may otherwise be located on the customer's local computer. For example, ASPs can provide searchable databases of various types (for example, legal, medical, financial, educational, scientific, marketing, etc.) of documents. Alternatively, some ASPs provide in-house applications which are not on individual personal computers, but instead on a centralized computer (for example, a server) accessible by individual users via an intranet. An ASP may charge a customer for services rendered, typically on a pay-per-use basis or a contract basis. The term "ASP" herein is intended to be broadly interpreted and to include a provider that allows a user to use application software not loaded on the user's computer.

In the example of FIG. 1, a user may connect to one of the ASPs 10-1 through 10-N through document manager 15 via the networks 16 and 18, to download a document in order to, for example, view it on the display of the image capture device 13, print it with a printer, store it in a local storage device and/or a removable medium drive, etc. In addition, in another example, a document may be uploaded from the image capture device 13 to the document store 17 through the ASP 19-1. Accordingly, the document store may be maintained by the ASP or by the document manager.

Figure 2:
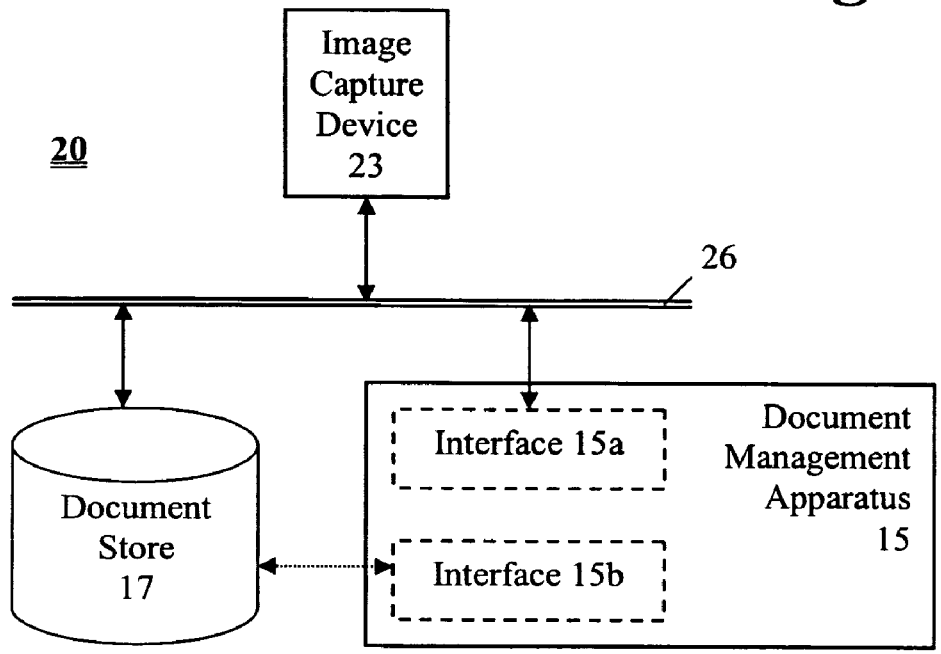
FIG. 2 shows a block diagram of a system for managing documents, in accordance with another exemplary embodiment of the present disclosure.

In another exemplary embodiment (FIG. 2), image capture device 23 in system 20 communicates with the document manager 15 through network 16, and can upload documents to and retrieve documents from the document store or database 17 through the document manager 15. The document manager 15 maintains the database 17, and the database 17 can be connected to the network 26 and/or directly to the document manager 15.

The mechanisms and methodologies of this specification can be embodied in a computer-based product that may be stored on a storage medium and include instructions that can be used to program a computer to perform a method in accordance with this specification. The storage medium can include, but is not limited to, any type of disk including floppy diskettes, optical disks, magneto-optical disks, ROMs, RAMs, EPROMs, EEPROMs, FLASH memory, or any type of media suitable for storing electronic instructions.

Figure 3:
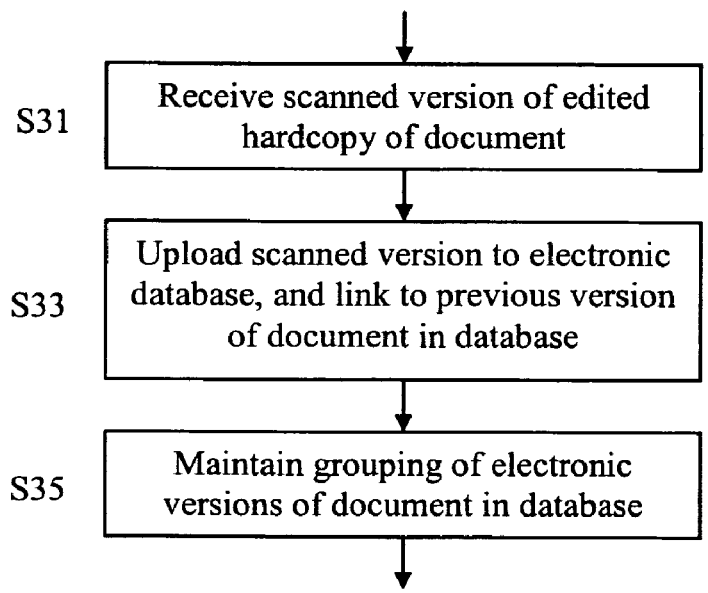
FIG. 3 shows a flow chart of a method for managing documents, in accordance with an exemplary embodiment of the present disclosure.

A method for managing documents, according to an exemplary embodiment of the present disclosure, is discussed below with reference to FIG. 3. A scanned version of an edited hardcopy of a document is received from image capture device 13 or 23 (step S31). The scanned version of the hardcopy of the document uploaded to an electronic database (for example, document store 17), and is linked to a previous electronic version of the document in the database as an update of the previous electronic version (step S33). A grouping of a plurality of electronic versions of the document is maintained in the database (step S35). In addition, the user may be allowed to specify index information to be included with the scanned version of the document.

The plurality of electronic versions of the document in the database are associated with respective, unique document index IDs. When the hardcopy of the document is printed, the document is printed with corresponding document index ID information thereon. Each document index ID number may be associated with information indicating whether the corresponding electronic version of the document is a scanned version.

When the scanned version of the edited hardcopy of the document is processed, document index ID information is extracted therefrom and the extracted document index ID information is utilized to determine the previous version of the document associated with the document index ID information. That is, the extracted document index ID information corresponds to the previous version of the document. When the scanned version of the edited hardcopy is uploaded, the scanned version is assigned another document index ID (different from the extracted document index ID) and the assigned document index ID can be saved along with the assigned document index ID in the database. Further, when the scanned version of the document is uploaded, a notification may be sent by e-mail (or another communication means or medium, such as instant messaging, voicemail, facsimile, etc.) to one or more prespecified addresses that the scanned version of the document has been uploaded to the database.

If the scanned version of the document includes an indication that the scanned version is a finalized version of the document, the plurality of electronic versions of the document in the database can be locked to prohibit adding additional versions of the document to the database. For example, the method may further comprise processing the scanned version of the edited hardcopy of the document to extract an approval signature thereon, and locking the scanned version as the final version of the document if the approval signature is extracted from the scanned version. The scanned version of the document may include a barcoded cover sheet, and the barcoded cover sheet includes a signature authenticating annotations on the edited hardcopy of the document.

In another example, the method may further comprise processing the scanned version of the edited hardcopy of the document to extract document index ID information and an approval signature thereon, utilizing the extracted document index ID information to determine the previous version of the document associated with the document index ID information, comparing contents of the scanned version of the edited hardcopy of the document with contents of the previous version associated with the extracted document index ID information, and locking the scanned version as the final version of the document if (i) the approval signature is extracted from the scanned version and (ii) the contents of the scanned version are the same as the contents of the previous version.

Figure 4:
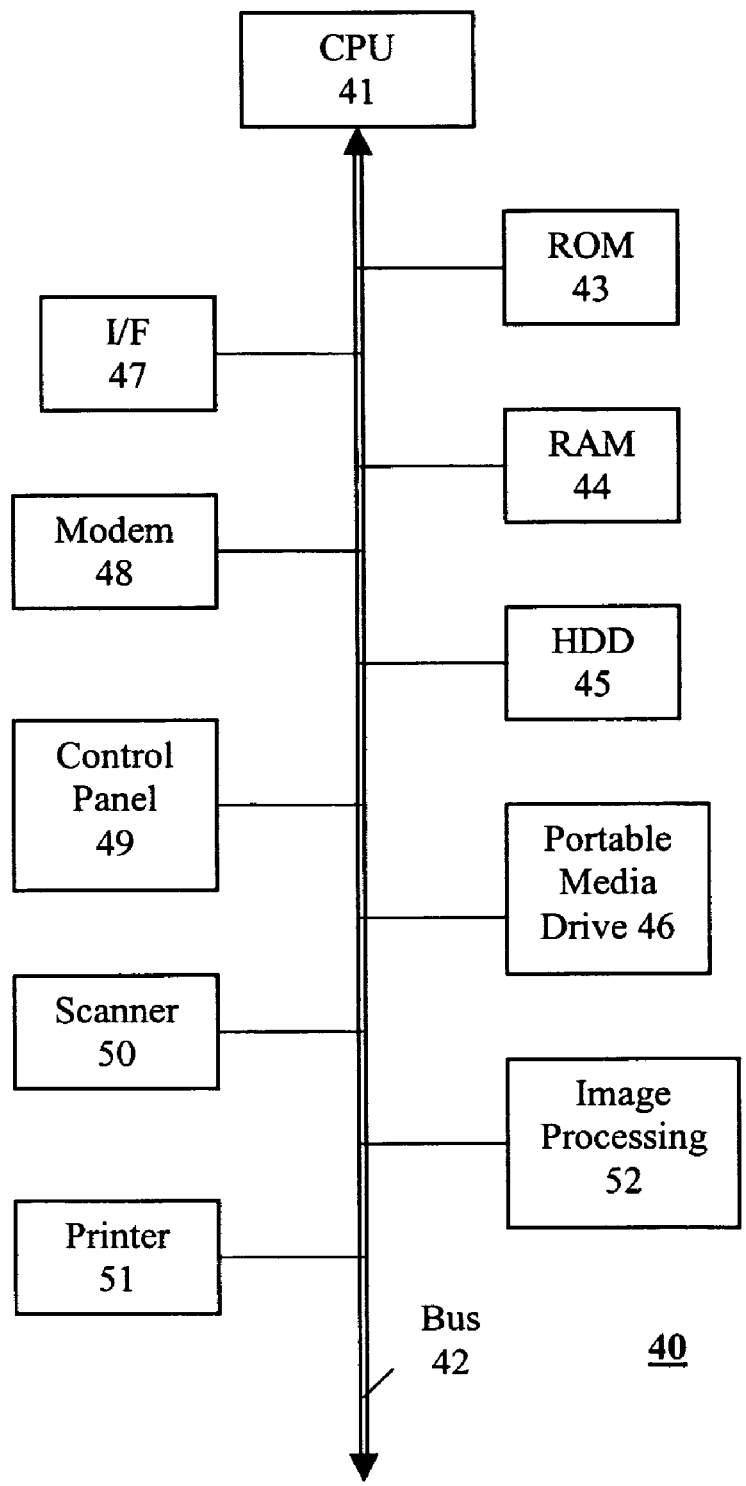
FIG. 4 illustrates an example of an image capture device.

An image capture device according to an exemplary embodiment is described below in connection with FIG. 4. Image capture device 40 includes a central processing unit (CPU) 41, and various elements connected to the CPU 61 by an internal bus 42. The CPU 41 services multiple tasks while monitoring the state of the image capture device 40. The elements connected to the CPU 41 include a read only memory (for example, ROM, PROM, EPROM, EEPROM, etc.) 43, a random access memory (RAM) 44, a hard disk drive (HDD) 45, portable media (for example, floppy disk, optical disc, magnetic discs, magneto-optical discs, semiconductor memory cards, etc.) drives 46, a communication interface (I/F) 47, a modem unit 48, a operation panel 49, a scanner unit 50, a printer unit 51, and an image processing device 52.

Program code instructions for the image capture device 40 can be stored on the read only memory 43, on the HDD 45, or on portable media and read by the portable media drive 46, transferred to the RAM 44 and executed by the CPU 41 to carry out the instructions. These instructions can include the instructions to the image capture device to perform specified ones of its functions and permit the image capture device 40 to interact with the server 12 and the document manager 15 and to control the operation panel 49 and the image processing unit 52 of the image capture device 40.

The operation panel 49 includes a display screen that displays information allowing the user of the image capture device 40 to interact with the server 12 and with the document manager 15. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the image capture device, so as to allow the operator to conveniently take advantage of the services provided by the system. The display screen does not need to be integral with, or embedded in, the operation panel 49, but may simply be coupled to the operation panel by either a wire or a wireless connection. The operation panel 49 may include keys for inputting information or requesting various operations. Alternatively, the operation panel 49 and the display screen may be operated by a keyboard, a mouse, a remote control, touching the display screen, voice recognition, or eye-movement tracking, or a combination thereof.

The image capture device 40 is a multifunction device (with scanner, printer and image processing) and in addition can be utilized as a terminal to download documents from the document store 17 or another database.

An example of a workflow for obtaining a document from the document store or database through user operation via a user interface (for example, on an operation panel) at the multifunction device 40 will now be discussed with reference to FIGS. 5A through 5E.

A user logs-in by entering user information and password (and optionally also account information to enable proper accounting of use of the system in this login session) through a GUI, such as shown in FIG. 5A, in order to access documents in the electronic database. The user information and password information are utilized to authenticate the user for access to the database. Other methods of authentication may also be used. For example, the multifunction device may be equipped with a secure card reader (or another electronic device) or one or more biometrics means (such as comparing fingerprints, palm prints, voice or speech, retinas or irises, facial expressions or features, signature, etc.).

Next, after the user is authenticated, the user is allowed to choose whether he or she wishes to (i) select a working document which the user is authorized to access, (ii) select a template document, or (iii) search for a document in the database (FIG. 5B).

If the user chooses (i), a list of working documents which the user is authorized to access is presented for selection (FIG. 5C). After one of the working documents is selected, the system can either automatically choose one of the versions of the working document (for example, the most recent version uploaded by anyone, the most recent version accessed or uploaded by the user, etc.) or present a list of versions of the selected working document for selection by the user (for example, if the "All Versions" button in FIG. 5C is pressed). After a version of the working document is selected, the selected version of the document is retrieved from the database, and the user is presented with a (scrollable) view of the selected version and an option to print the document (FIG. 5D).

On the other hand, if the user chooses (ii), a list of available templates is presented for selection, and after one of the templates is selected, the selected template is used to form a working document which can be viewed and/or printed.

If the user chooses (iii), the user is presented with a GUI panel (FIG. 5E) through which the user can specify search terms (for example, keyword, author name, file name, document type, creation or modification date, etc.). A search of the database is performed according to the search terms, and then a list of documents containing the search terms is presented for selection by the user. After the user selects a document, the selected document is presented for viewing and printing.

In any event when a document retrieved from the database is printed, document index ID information, such as a bar code, is applied to the hardcopy printout of the document to identify the document and version that was printed. After the hardcopy is edited with typed or handwritten annotations, a user can log-in to the system, scan the edited hardcopy and upload the scanned version to the database. When the document is scanned, the user does not need to specify the document (or version) being scanned because the system will process the document index ID information on the scanned document and appreciate that the scanned document is an updated version of the document identified by the document index ID information. This automatic hardcopy document update method is not limited to any particular file format, and can be applied to both electronic documents, to hardcopy documents and to a combination of the two. For example, the document can be created using a MS WORD application and then updated with a new version that is a scanned version of an edited hardcopy of the document, in PDF file format. Use of document index ID information connects electronic file format documents and hardcopy documents and makes the document update process easy and simple for use with one scan.

An additional features of the system is that the user can indicate on the annotated hardcopy of the document that the scanned version of the hardcopy document is to be made the final version of the document. For example, each template document can include a "Final" checkbox. In addition, a printout of a document retrieved from the database can include the "Final" checkbox, in addition to document index ID information. The user can place a check in the "Final" checkbox on the annotated hardcopy to indicate that the document as edited on the hardcopy is finalized. When the hardcopy bearing the "Final" checkbox mark is scanned and processed, the system identifies the scanned version as the final version of the document and prohibits further versioning of the document. No additional modifications to the versions of the document in the database are allowed.

An example of a workflow in the document management system of FIG. 1 (or FIG. 2) will now be described with reference to FIGS. 6A and 6B.

The process is commenced with a user logging-in by entering username information and password information at the image capture device 13 (or 23) which are processed by the system (the image capture device, the server 12, the document manager 15 or the database 17) for authentication purposes (step S61). If the user is not authenticated (step S62, NO), an error message is displayed (step S63). If it is determined that the user should not have the option to attempt login again (step S64, NO), an END message is displayed (step S65). On the other hand, if the authentication process determines that the user should be allowed to login again (step S64, YES), the process loops back to step S61.

If the user is authenticated for access to the document store 17 (step S62, YES), it is determined whether the user has (that is, the user is authorized to access) any working documents in the document store (step S66). If the user has one or more working documents (step S66, YES), a list of the saved working documents and templates are displayed (step S67). If the user does not have any working documents (step S66, NO), only a list of templates is displayed (step S68). If the user specifies search terms for a search of the database, the search is performed and a list of documents containing the search terms is displayed for user selection.

After a document in the displayed list is selected (step S69), the selected document is retrieved and displayed (step S70). If the user selects a print function to print the document, the document is printed with document index ID information on the printed hardcopy (step S71). The printed document index ID information may replace document index ID information in the previous stored version, without the user knowing what index ID numbers are. The association of the printed document index ID information with the printed hardcopy is recorded in the database.

With the hardcopy in hand, the user logs out (step S72), and then can proceed to make (typed or handwritten) annotations on the hardcopy (step S73). If the user does not wish to scan and upload the edited hardcopy to the database (step S74, NO), the process ends.

On the other hand, if the user wishes to scan and upload the edited hardcopy to the database (step S74, YES), the user logs-in again (step S73), an authentication process is performed (steps S77 through S80) similar to steps S62 through S65. If the user is authenticated for access to the data store (step S77, YES), the annotated hardcopy is scanned (step S81). There is no need for the user to specify the document to be updated. The system processes the image data from the scanning process and extracts the document index ID information from the image data (step S82), and then the scanned version is added to the collection of versions of the document in the database, identifying the scanned version by the extracted document index ID information (step S83).

Every document (including templates) in the document store can have a corresponding unique, document index ID, and the document index ID information is embedded when the document is printed.

In the examples above, the image capture device is exemplarily a multifunction device. However, the image capture function can be provided by a personal computer (PC) which can be coupled to a scanner. An example of such a personal computer is shown schematically in FIG. 7.

Figure 7:
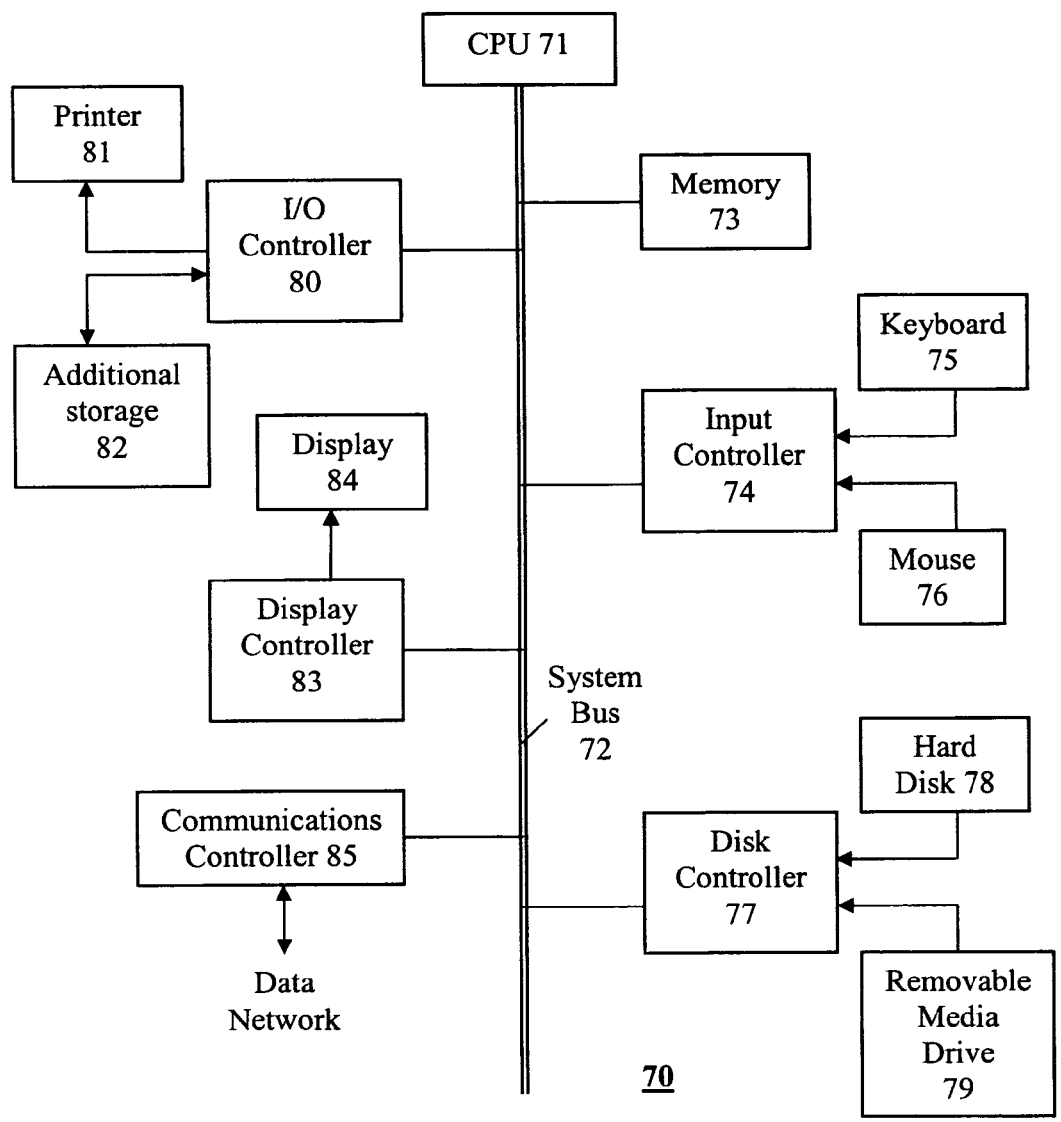
FIG. 7 shows a block diagram of an example of a computer which can be coupled to a scanner and software-adapted to implement an image capture device.

In FIG. 7, computer 70 includes a central processing unit (CPU) 71 that communicates with a number of other devices by way of a system bus 72. Memory 73 provides storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.]. A communication controller 85 provides a connection (for example, by way of an Ethernet connection or other network connection which supports any desired network protocol such as, but not limited to TCP/IP, IPX, IPX/SPX, or NetBEUI) to a data communication network.

Additional components of the computer 70 are conventional and well-known, and in the interest of clarity are not discussed in detail herein. Such components are discussed, for example, in "How Computers Work", by Ron White (Que Corporation 1999), the entire content of which are incorporated by reference herein.

Figure 8A:
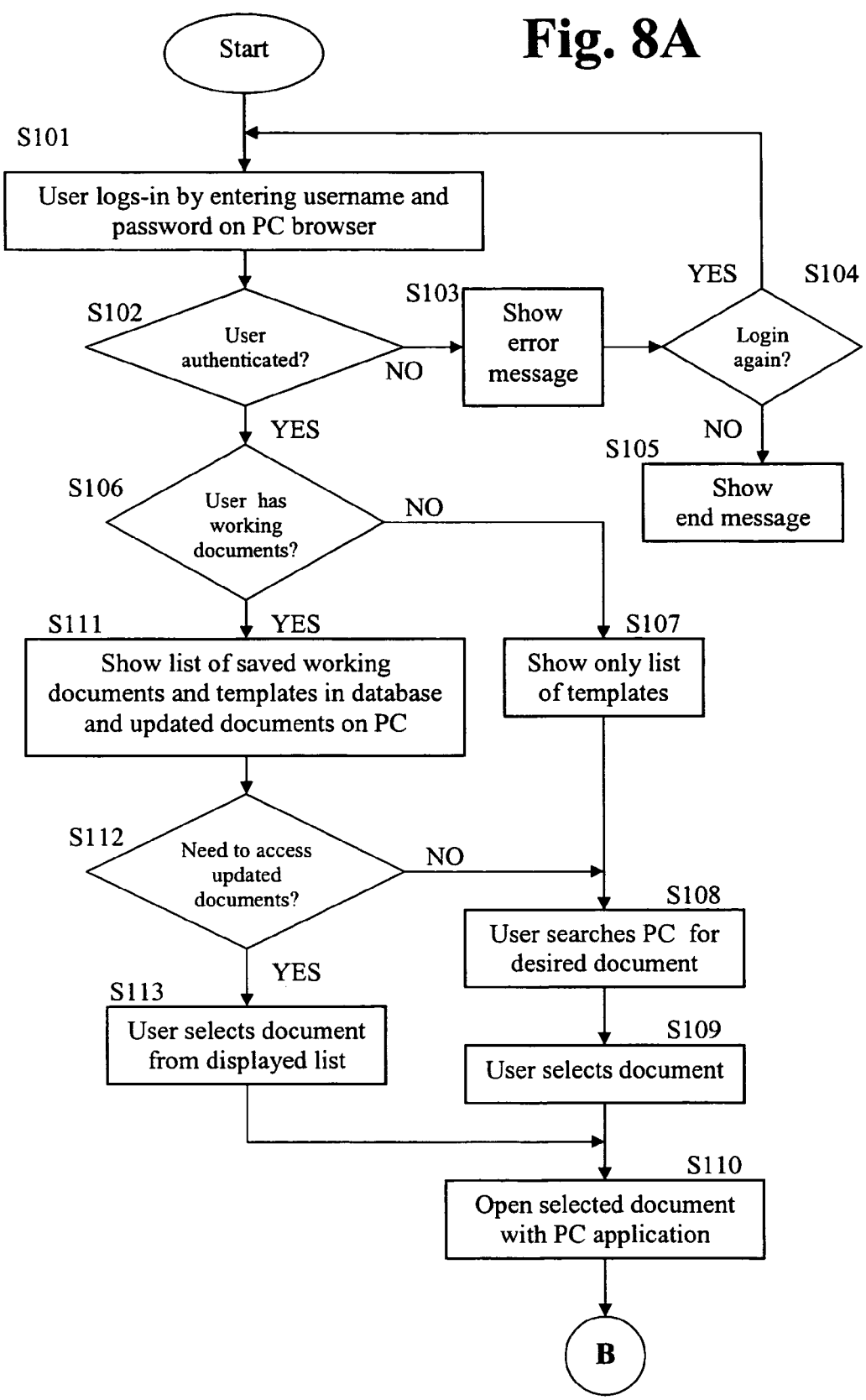
FIGS. 8A and 8B show a flow chart for an example of a workflow in a document management system in which a PC coupled to a scanner performs the functions of an image capture device.
Figure 8B:
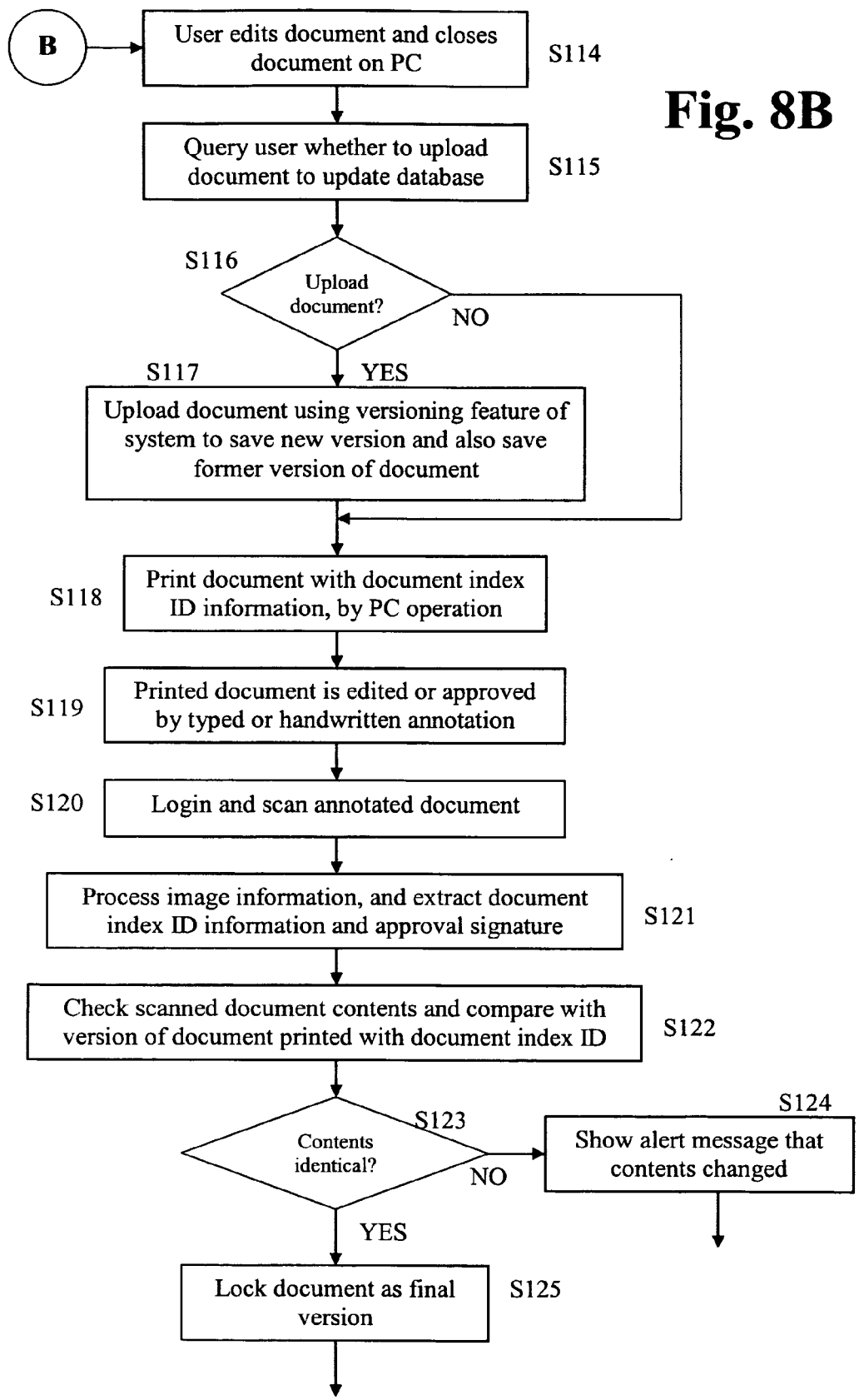

An example of a workflow in a document management system in which a PC is used for document preparation and in conjunction with a scanner can perform the functions of an image capture device is described below with reference to FIGS. 8A and 8B.

Figure 6A:
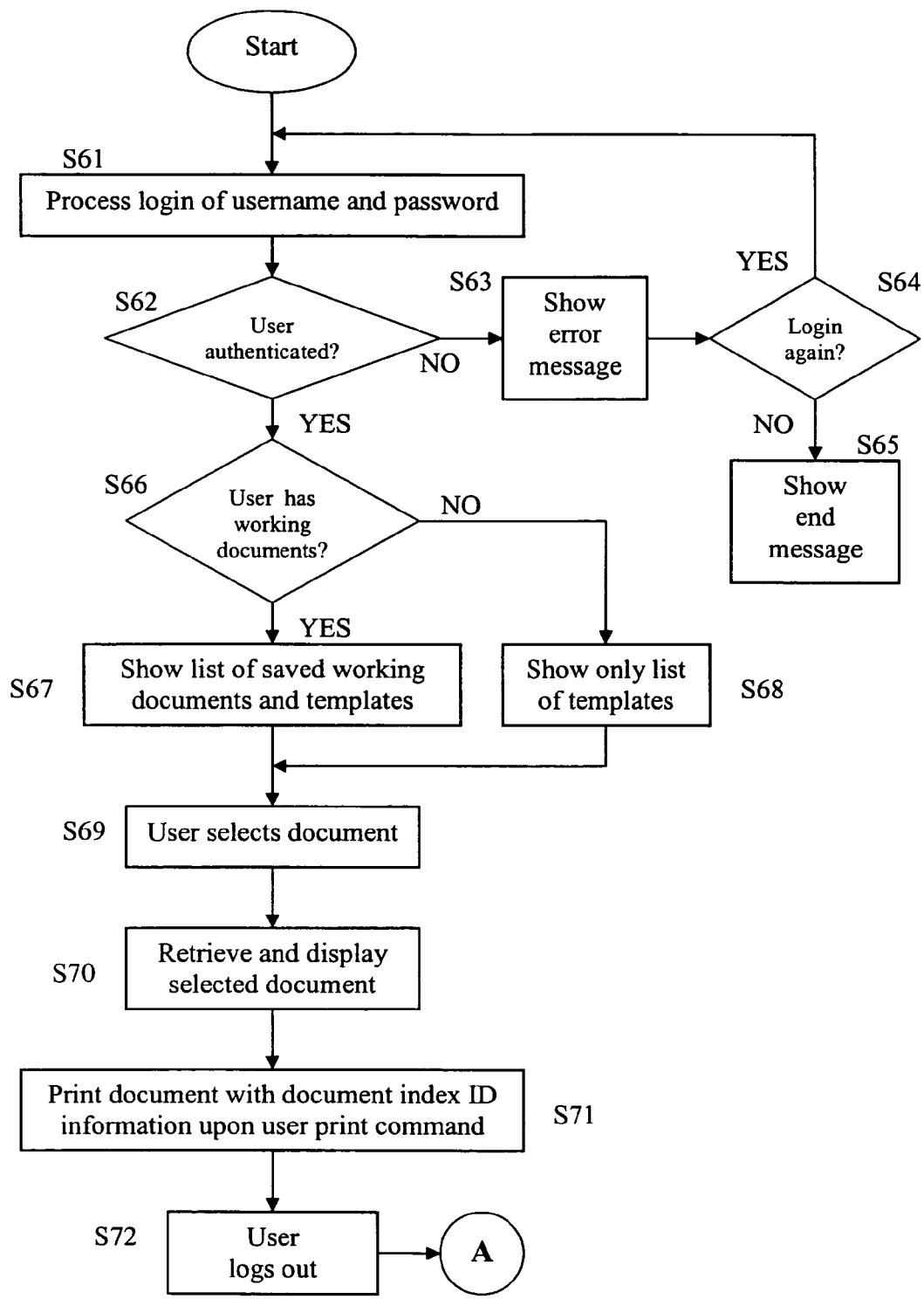
FIGS. 6A and 6B show a flow chart for an example of a workflow in the system of FIG. 1 or system of FIG. 2.
Figure 6B:
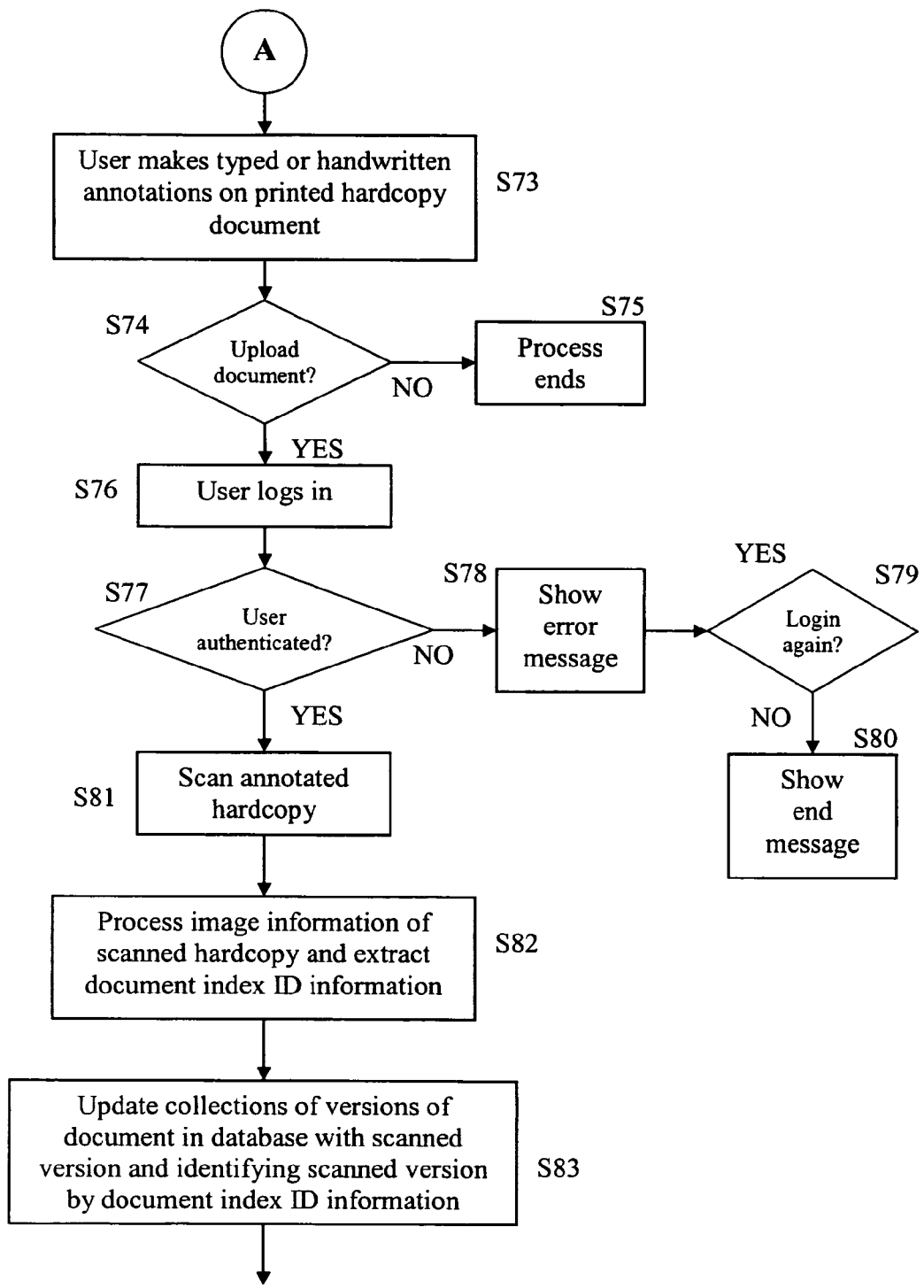

Initially, a login and authentication process is performed (steps (S101 through S105), similar to steps S61 through S65 in the example of FIGS. 6A and 6B.

If the user is authenticated for access to the document store 17 (step S102, YES), it is determined whether the user has any working documents in the document store (step S106). If the user does not have any working documents in the document store (step S106, NO), only a list of templates is displayed (step S107). The user then typically specifies search terms for a search of the PC for a desired document (step S108). For example, the user may specify a client name, a document ID, a keyword, etc., which likely appears in the index information of the desired document. A search based on the specified search terms is performed and a list of documents containing the search terms is displayed for user selection (step S109).

If the user has one or more working documents in the document store (step S106, YES), a list of the saved working documents and templates in the database and updated documents (that is, updated version of a document in which a previous version is stored in the document store) saved on the PC is displayed (step S111). If the user wishes to find a desired document not in the displayed list (step S112, NO), then the process proceeds to step S108 (as discussed above) wherein the user specifies search terms for a search. On the other hand, the user may select one of the updated documents in the displayed list (step S113).

In any event, after a document is selected (step S109 or S113), the selected document is retrieved and opened with appropriate application software on the PC (step S110). The user edits the document utilizing the application and then closes the document on the PC (step S114). When the document is closed, a pop-up panel is presented to query the user whether the modified document should be uploaded to the document store to update the database (step S115). If the user indicates that the database should be updated with the new version (step S116, YES), the database is updated through the versioning feature to save the new version and also the previous version (step S117), assuming the previous version is not already saved in the document store. Each saved version has its corresponding unique document index ID.

Next, the document is printed, with document index ID information on the printed hardcopy and without the user knowing what index ID numbers are (step S118). As discussed above, the association of the printed document index ID information with the printed hardcopy is recorded in the database.

The printed hardcopy is then reviewed by the user or someone else, and can be approved or edited via (typed or handwritten) annotations on the hardcopy (step S119). The reviewed document bearing annotations (for example, approval signature, or changes or comments) can then be scanned via a multifunction device (after login) in the system or via a scanner connected to the PC (step S120). The scanned image is processed, to extract the document index ID information from the image data and extract the approval signature if one is present on the document (step S121).

In addition, the contents of the scanned document are compared (in step S122) to the contents of the document associated with the extracted document ID which was saved in the database in step S117. If an approval signature was extracted but the contents of the scanned version are different from the contents of the saved version associated with the extracted document ID (step S123, NO), then an alert message is displayed, indicating that contents have changed (step S124). If an approval signature was extracted and the contents are the same (step S123, YES), the scanned version is uploaded to the document store and locked as the final version of the document (step S125).

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

In addition, in several of the examples above, the hardcopy of the document is printed by a printer at the user end of the image capture device, edited and then scanned by the image capture device. However, it should be apparent that the hardcopy can be printed elsewhere.

What is claimed is:

1. A method for managing documents, comprising:
   (a) receiving a scanned version of an edited hardcopy of a document from an image capture device;
   (aa) electronically processing the scanned version of the edited hardcopy of the document to extract document index ID information from the scanned version of the edited hardcopy of the document;
   (ab) utilizing the document index ID information extracted from the scanned version of the edited hardcopy of the document in (aa), to determine automatically whether a previous electronic version of the document associated with the document index ID information is in an electronic database;
   (b) uploading said scanned version of the edited hardcopy of the document to the electronic database, and if it is automatically determined in (ab) based on the document index ID information extracted from the scanned version of the edited hardcopy of the document that the previous version of the document associated with the document index ID information is in the electronic database, automatically linking said scanned version of the edited hardcopy of the document to the previous electronic version of the document in the database as an update of said previous electronic version of the document, without a user specifying said previous electronic version; and
   (c) maintaining a grouping of a plurality of electronic versions of the document in the database.

2. The method of claim 1, wherein said plurality of electronic versions of the document in the database are associated with respective, unique document index IDs.

3. The method of claim 1, further comprising printing said hardcopy of the document with document index ID information thereon.

4. The method of claim 1, further comprising comparing contents of said scanned version of the edited hardcopy of the document with contents of the previous version associated with the extracted document index ID information.

5. The method of claim 1, further comprising assigning a document index ID to said scanned version of the edited hardcopy of the document, wherein said scanned version is saved along with the corresponding document index ID in said database.

6. The method of claim 1, further comprising locking said plurality of electronic versions of the document to prohibit adding additional versions of the document, if the scanned version of the document includes an indication that said scanned version is a finalized version of the document.

7. The method of claim 1, further comprising:
   processing said scanned version of the edited hardcopy of the document to extract an approval signature thereon; and
   locking said scanned version as the final version of the document if said approval signature is extracted from said scanned version.

8. The method of claim 1, further comprising:
   processing said scanned version of the edited hardcopy of the document to extract an approval signature thereon;
   comparing said scanned version of the edited hardcopy of the document with the previous version associated with the extracted document index ID information; and
   locking said scanned version as the final version of the document if (i) said approval signature is extracted from said scanned version and (ii) said scanned version is the same as the previous version.

9. The method of claim 1, wherein the scanned version of the document includes a barcoded cover sheet, and the barcoded cover sheet includes a signature authenticating annotations on the edited hardcopy of the document.

10. The method of claim 1, wherein the hardcopy of the document is a printout of said previous electronic version of the document.

11. The method of claim 10, wherein the edited hardcopy of the document includes annotations added by handwriting or typing to the computer printout.

12. The method of claim 1, further comprising:
   displaying a listing of the plurality of electronic versions of the document to allow a user to select one of the electronic versions of the document;
   displaying the selected version of the document to allow the user to view contents thereof; and
   allowing the user to request a printout of the selected version of the document,
   wherein the user edits the printout and scans the edited printout to generate said scanned version of the document.

13. The method of claim 12, wherein said printout of the selected version of the document includes document index ID information.

14. The method of claim 1, wherein said plurality of electronic versions of the document is accessible by a plurality of users, and access is allowed to an authorized user only after access right to the electronic versions of the document is authenticated.

15. The method of claim 1, further comprising:
   displaying, after access rights of an authorized user are authenticated, a listing of stored working documents to which said authorized user has access rights;
   allowing the user to select one of the working documents;
   displaying a listing of versions of the working document stored in the database; and allowing the user to scan another version of the working document and upload said another version to the database.

16. The method of claim 1, further comprising:
storing index information for each working document to which an authorized user has access rights;
allowing, after access rights of said authorized user are authenticated, the user to specify one or more terms for searching the working documents; and
returning a list of a subset of the working documents containing the specified terms, and allowing the user to select one of the working documents in the list.

17. The method of claim 1, further comprising displaying a listing of a plurality of electronic templates to allow a user to select one of the electronic templates for printing, wherein the user edits the printout and scans the edited printout to generate an electronic document.

18. The method of claim 1, further comprising allowing a user to specify index information to be included with said scanned version of the document.

19. The method of claim 1, further comprising associating each electronic version of the document with a corresponding document index ID number, and associating each document index ID number with information indicating whether the corresponding electronic version of the document is a scanned version of the document.

20. The method of claim 1, further comprising sending a notification to one or more prespecified addresses that said scanned version of the document has been uploaded to the electronic database.

21. The method of claim 1, wherein said plurality of electronic versions of the document includes said scanned version of the edited hardcopy of the document and said previous electronic version of the document.

22. A program storage medium readable by a computer and tangibly embodying a program of instructions executable by the computer, said program comprising:
a document receiving part configured to receive a scanned version of a document from an image capture device through a data communication network;
a document manager part configured to
process said scanned version of the document to extract document index ID information thereon,
utilize the extracted document index ID information to determine automatically whether a previous version of the document associated with the document index ID information is in an electronic database,
store said scanned version of the document in the electronic database,
if it is automatically determined based on the document index ID information extracted from the scanned version of the edited hardcopy of the document that the previous version of the document associated with the document index ID information is in the electronic database automatically link said scanned version of the edited hardcopy of the document to the previous electronic version of the document in the database as an update of said previous electronic version of the document, without a user specifying said previous electronic version, and maintain a grouping of a plurality of electronic versions of the document in the database.

23. A document management apparatus comprising:
a first interface for communication with an image capture device;
a second interface for communication with an electronic database;
a document manager configured to process a scanned version of a document received through said first interface, the processing by said document manager including
processing said scanned version of the document to extract document index ID information thereon,
utilizing the extracted document index ID information to determine automatically whether a previous version of the document associated with the document index ID information is in said electronic database,
uploading said scanned version of the document to said electronic database through said second interface,
if it is automatically determined based on the document index ID information extracted from the scanned version of the edited hardcopy of the document that the previous version of the document associated with the document index ID information is in the electronic database automatically linking said scanned version of the edited hardcopy of the document to the previous electronic version of the document in the database as an update of said previous electronic version of the document, without a user specifying said previous electronic version, and
maintaining a grouping of a plurality of electronic versions of the document in the database.

24. A system for managing documents, comprising:
one or more image capture devices;
an electronic database;
a document manager coupled to said one or more image capture devices through a data communication network,
wherein when said document manager receives a scanned version of a document through said data communication network, said document manager
processes said scanned version of the document to extract document index ID information thereon,
utilizes the extracted document index ID information to determine automatically whether a previous version of the document associated with the document index ID information is in said electronic database,
uploads said scanned version of the document to said electronic database,
if it is automatically determined based on the document index ID information extracted from the scanned version of the edited hardcopy of the document that the previous version of the document associated with the document index ID information is in the electronic database, automatically causes said scanned version of the edited hardcopy of the document to be linked to the previous electronic version of the document in the electronic database as an update of said previous electronic version of the document, without a user specifying said previous electronic version, and
causes a grouping of a plurality of electronic versions of the document to be maintained in the database.

* * * * *